United States Patent [19]

Beust

[11] Patent Number: 4,625,975
[45] Date of Patent: Dec. 2, 1986

[54] INSTALLATION FOR SEALS

[75] Inventor: Wolfgang Beust, Duesseldorf, Fed. Rep. of Germany

[73] Assignee: Mannesmann Aktiengesellschaft, Duesseldorf, Fed. Rep. of Germany

[21] Appl. No.: 697,266

[22] Filed: Feb. 1, 1985

[30] Foreign Application Priority Data

Feb. 2, 1984 [DE] Fed. Rep. of Germany ... 8402968[U]

[51] Int. Cl.$^4$ .......................... F16J 15/18; B23P 19/04
[52] U.S. Cl. ...................................... 277/9.5; 277/11; 29/281.1; 29/802; 29/281.4; 29/281.5
[58] Field of Search ............................ 277/1.9, 9.5, 11; 29/281.1, 281.4, 281.5, 802

[56] References Cited

U.S. PATENT DOCUMENTS

| 362,355 | 5/1887 | Bradford | 277/11 |
|---|---|---|---|
| 3,432,172 | 3/1969 | Hendrickson | 277/11 X |
| 3,780,421 | 12/1973 | White et al. | 29/281.4 X |
| 4,364,170 | 12/1982 | Ratliffe | 29/281.1 X |

FOREIGN PATENT DOCUMENTS

| 59-175936 | 10/1984 | Japan | 29/281.4 |
|---|---|---|---|
| 372842 | 4/1973 | U.S.S.R. | 277/9 |

Primary Examiner—Robert S. Ward
Attorney, Agent, or Firm—Ralf H. Siegemund

[57] ABSTRACT

Seals between a wheel and a cover which rotate in relation to each other are installed under utilization of auxiliary equipment which includes a ring with annularly distributed bores and held against an abutment surface in the wheel while another ring of U-shaped cross-section has one of the flanges in abutment with an annular abutment surface of the cover; the other flange has threaded bores for receiving tension screws by means of which the two rings are held together for temporarily holding the wheel to the cover, particularly during installation of the axle and bolting of the cover, for example, to the swivel in a full track vehicle.

5 Claims, 3 Drawing Figures

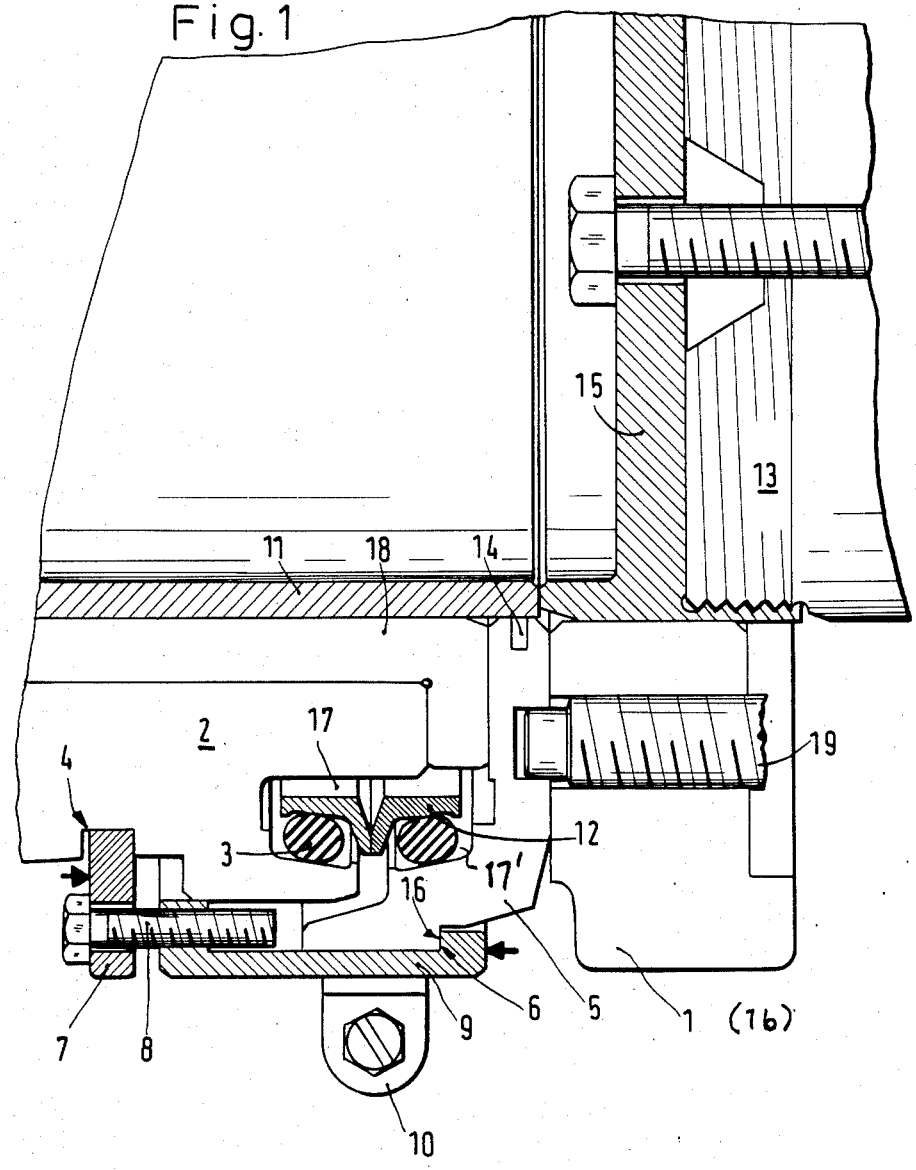

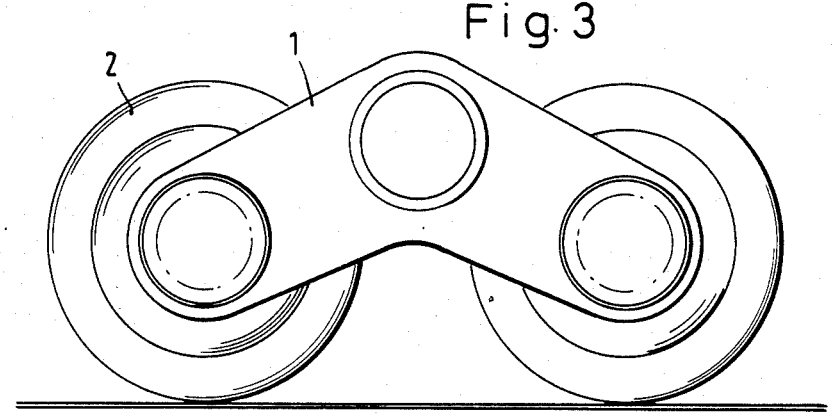
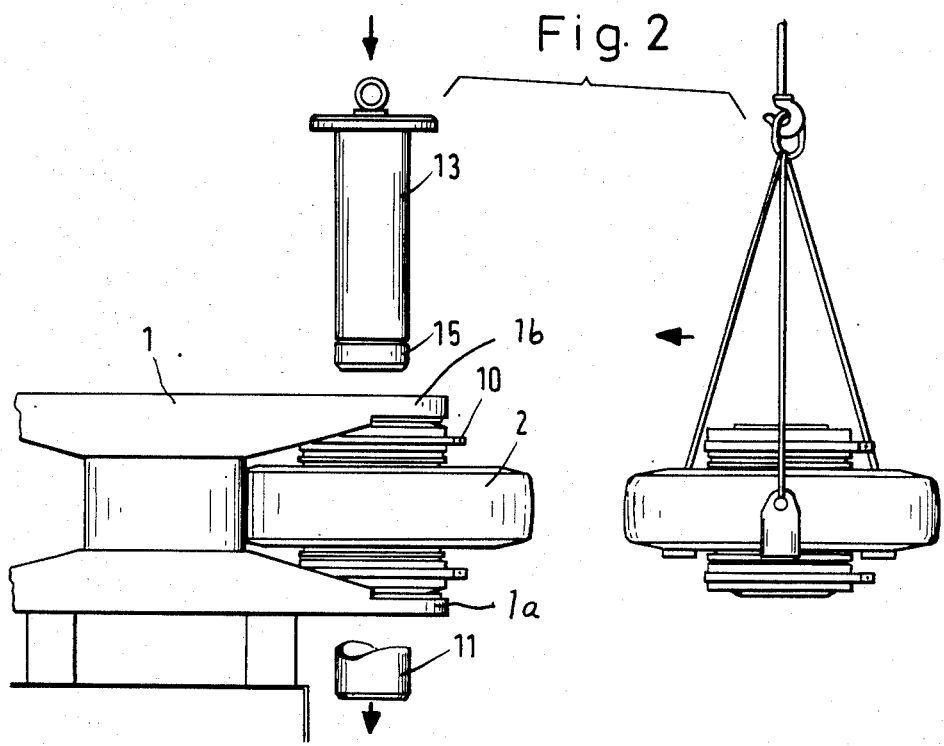

INSTALLATION FOR SEALS

BACKGROUND OF THE INVENTION

The present invention relates to the installation of sealing between two coaxially arranged components or part which may rotate in relation to each other.

Installation of seals between rotating parts is difficult, particularly in view of the fact that they must have particular tension in order to adequately seal, for example, against emergence of oil. Moreover, certain dimensions of installation, such as between the side walls of a swivel part in a vehicle, have to be maintained.

DESCRIPTION OF THE INVENTION

It is an object of the present invention to provide a new and improved device and method for installation of seals and sealings between two coaxially arranged parts which are permitted to rotate in relation to each other under the condition that a particular bias on the seal, as far as tension is concerned, can be maintained without compromising on the sealing function and its integrity.

In accordance with the preferred embodiment of the present invention, it is therefore suggested that the two parts receiving the seals have abutment surfaces for two different rings, each being composed of at least two segments and can be tensioned to each other through tension screws, bolts or the like. By means of these rings and the screws or bolts, it is possible to tension the highly reliable lifetime seals with a very high degree of precision. The individual points of lubrication, for example, of a full track or caterpillar vehicle, do no longer have to be connected through pipes to a central lubricating structure which has been the customary proceedings. Central equipment for dispensing lubricating grease require grooves in sleeves made of bronze. Since the grease traversed bronze discs, an unnecessary consumption in grease of about 20,000 kilograms per year entailed, which constitutes some form of environmental contamination.

In furtherance of the invention, it is suggested that one of the abutment surfaces has an annular groove for a two-part flat ring, which ring in turn has circumferentially distributed several bores for the clamping screws; these bores are situated radially outward from the annular groove; the other abutment surface is configured as an abutment shoulder for a flange of a multiple part U-shaped tension ring the other flange of which being provided with threaded bores for the aforementioned tension screws. The tension ring may be enveloped by a clamp, particularly if gaps of the segments are not staggered. In the case of a 90 degree displaced arrangement of the gaps in the segments, this clamping ring is not necessary.

The ring grooves mentioned above may be provided on both sides of a wheel, particularly in its two hub ends, and the abutment shoulder may be provided as elements of covers which bear against end faces of the hub. The covers are placed on the wheel by means of a centering tube, and during installation they will be secured against rotation by being affixed between plates of a swivel arranged to both sides of the wheels in a full track vehicle. The covers further have a central bore being provided with annular grooves for additional seals which bear in the operating state against the axle and limit the travel of the oil which is situated between the seals and the above-mentioned lifetime seals in the vicinity of the wheel. After mounting the wheel between the sidewalls of the swivel the tension screws can be or should be relieved. The divided rings can be removed because the tension of the lifetime seal is now maintained by the plates of the swivel to which the covers are affixed, holding the covers against the wheel proper.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 is a cross-section through seal installation in accordance with the preferred embodiment of the present invention for practicing the best mode thereof;

FIG. 2 illustrates somewhat schematically in side elevations the procedure of installing a wheel between the plates of a swivel in a full track vehicle; and FIG. 3 illustrates the swivel with wheels in side elevation.

Proceeding now to the detailed description of the drawings, FIG. 1 illustrates the axle 2 of a vehicle as it is being arranged between the plates or sidewalls 1a and 1b of a swivel 1. The same swivel is also shown in FIGS. 2 and 3, so are the wheels 2. A bronze sleeve 18 runs through the axle of the wheel 2. A centering tube 11 in turn traverses the bronze sleeve 18 for purposes of centering cover 5 during assembly. The end of the axle of the wheel 2, as well as the cover 5, have mutually facing annular grooves 17 and 17', respectively, for receiving rubber rings 3 and seals 12. These latter elements are forced against each other by means of clamping screws or bolts 8 in the following manner and as a temporary feature.

The axle of wheel 2 is provided with an annular groove 4 for receiving a two-part flat ring 7. The cover 5 has an abutment shoulder 6 bearing against a flange edge 16 of a multiple part tension ring 9 having a U-shaped cross-section. The other flange of that ring 9 has threaded bores for threadedly receiving the tension screws 8. This ring assembly 9 is enveloped by a clamping ring 10. The cover 5 moreover has a central bore which in turn is provided with an annular groove for receiving another seal, 14. After the axle 13 has been forced into the wheel, the seal 14 abuts that axle 13. During forcing of the axle 13 towards the wheel, the seal 14 has to be protected. Axle 13 has a threaded end which receives a threaded head piece 15. The threaded head piece 15 has a tubular front end with a strong chamfer. The chamfer is removed after forcing the axle 13 through the wheel and the two plates of the swivel 1. The cover 5 is moreover secured through pin screws 19 to the plates of the swivel 1.

The method and process of installation is more fully derivable from FIG. 2. One can see on the right-hand side that the wheel 2 hangs on a crane and is already provided with end covers 5, and the seals 3 and 12 are held in place by the assembly 7-8-9-10. Now the wheel is placed in between the two plates of the swivel 1. This precedent is shown in the left-hand portion of FIG. 2. Next, the axle 13 is to be forced through the wheel, as indicated by the vertical arrow in FIG. 2. After the axle has been forced into the wheel, which of course causes immediate removal of the centering tube 11 from the wheel arrangement, it is necessary to release the clamping screws 8 so that there will be no friction between the abutment surfaces of the flat rings 7 at the annular groove 4, nor must there be friction between the tension ring 9 and the abutment shoulder 6. The divided flat ring 7, as well as the divided ring 9, will be also removed after the tension screws 8 and the shell 10 has been removed.

It can thus be seen that the inventive equipment is comprised basically of the flat ring assembly 7, the tension ring assembly 9 with clamping screws 8 being provided to hold the parts 5 and 2 together to thereby maintain seals and rings 3 and 12 in abutment until such time the as parts have been completely assembled. This of course occurs when the wheel 2 is force seated on the axle 13 and after the cover 5 has been bolted to the swivel 1 because now the plates 1a and 1b of swivel 1 hold the covers such as 5 against the wheel. It should be noted of course that parts 5 and 2 are held against each other only during assembly. Subsequently, they will and must be able to rotate in relation to each other.

The invention is not limited to the embodments described above, but all changes and modifications thereof not constituting departures from the spirit and scope of the invention are intended to be included.

I claim:

1. Device for installing sealing between two coaxially arrangement but rotatable parts comprising:
    said two parts each being provided with annular abutment surfaces;
    said parts being provided with groove means for receiving sealing elements;
    two segmented ring means respectively abutting said abutment surfaces; and
    bolt means for temporarily bolting said segmented ring means together.

2. Device as in claim 1, one of said abutment surfaces being an annular groove for receiving a multi-part flat ring having peripherally distributed bores radially outside of the annular groove.

3. Device as in claim 1 wherein one of said parts has an abutment surface in form of an abutment shoulder, one of said ring means beings a multi-part tension ring with U-shaped cross-section having one flange provided for abutment with the respective abutment surface of said part, its other flange being provided with threaded bores for receiving said tension screws.

4. Device as in claim 1 wherein said one part is a hub of a wheel, the other part being a cover bolted to a swivel of a full track vehicle.

5. In an arrangement including a wheel, a shaft to be pressed into the wheel, a cover plate for the wheel hub to be bolted to a swivel for the wheel, comprising:
    annular groove means in said wheel and said cover facing each other for receiving seals to be maintained in sliding arrangement;
    said wheel and said cover being provided with annular abutment surfaces;
    a multi-part ring with peripherally distributed bores provided in abutment with one of the abutment surfaces;
    a ring with U-shaped cross-section and two flanges accordingly, one of the flanges being held against the other abutment surface, the other flange having threaded bores; and
    removable tension bolts traversing said peripheral bores and being threaded into the threaded bores of the ring with U-shaped cross-section for temporarily clamping the cover to the wheel.

* * * * *